United States Patent
Xu et al.

(10) Patent No.: US 12,336,039 B2
(45) Date of Patent: Jun. 17, 2025

(54) CONTEXT MANAGEMENT METHOD AND APPARATUS

(71) Applicant: Huawei Technologies Co., Ltd., Shenzhen (CN)

(72) Inventors: Xiaoying Xu, Shenzhen (CN); Chunhua You, Shanghai (CN); Qinghai Zeng, Shanghai (CN); Qufang Huang, Shenzhen (CN); Chong Lou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 379 days.

(21) Appl. No.: 17/855,166

(22) Filed: Jun. 30, 2022

(65) Prior Publication Data
US 2022/0338298 A1    Oct. 20, 2022

Related U.S. Application Data

(63) Continuation of application No. PCT/CN2019/130987, filed on Dec. 31, 2019.

(51) Int. Cl.
*H04W 36/00* (2009.01)
*H04W 76/27* (2018.01)
*H04W 76/32* (2018.01)

(52) U.S. Cl.
CPC .......... *H04W 76/27* (2018.02); *H04W 76/32* (2018.02); *H04W 36/0033* (2013.01)

(58) Field of Classification Search
CPC ..... H04W 76/00; H04W 76/20; H04W 76/27; H04W 76/30; H04W 76/32; H04W 76/34; H04W 72/231
See application file for complete search history.

(56) References Cited

U.S. PATENT DOCUMENTS

| | | | |
|---|---|---|---|
| 11,510,175 B2* | 11/2022 | Zeng | H04W 80/08 |
| 11,582,828 B2* | 2/2023 | Yang | H04W 76/30 |
| 2018/0227851 A1* | 8/2018 | Kubota | H04W 52/44 |
| 2018/0302914 A1* | 10/2018 | da Silva | H04W 76/27 |

(Continued)

FOREIGN PATENT DOCUMENTS

| | | |
|---|---|---|
| CN | 104255056 A | 12/2014 |
| CN | 107635271 A | 1/2018 |

(Continued)

OTHER PUBLICATIONS

"3rd Generation Partnership Project; Technical Specification Group Radio Access Network; NG-RAN; Architecture description (Release 15)," 3GPP TS 38.401 V15.6.0, total 46 pages, 3rd Generation Partnership Project, Valbonne, France (Jul. 2019).

(Continued)

*Primary Examiner* — Warner Wong
(74) *Attorney, Agent, or Firm* — Leydig, Voit & Mayer, Ltd.

(57) ABSTRACT

A context management method includes: when a distributed unit (DU) of a network side device receives a first message from a centralized unit (CU) of the network side device, the DU of the network side device may store a context of the terminal side device in an inactive state. The first message includes a second message, and the second message is used to indicate the terminal side device to enter the inactive state and release a connection to the network side device.

18 Claims, 7 Drawing Sheets

```
                    ┌─── 801
┌─────────────────────────────────────────┐
│ A DU of a network side device receives  │
│ capability information from a CU of the │
│ network side device                     │
└─────────────────────────────────────────┘
                    │
                    ▼
                    ┌─── 802
┌─────────────────────────────────────────┐
│ When the DU of the network side device  │
│ determines, based on the capability     │
│ information, that a terminal side       │
│ device is in an inactive state and has  │
│ a capability of transmitting uplink     │
│ information on a configured grant or    │
│ a scheduling grant, the DU of the       │
│ network side device stores (or keeps)   │
│ a context of the terminal side device   │
│ in the inactive state                   │
└─────────────────────────────────────────┘
```

(56) References Cited

U.S. PATENT DOCUMENTS

| | | | | |
|---|---|---|---|---|
| 2019/0327647 A1* | 10/2019 | Ozturk | ............... | H04W 12/10 |
| 2019/0327711 A1* | 10/2019 | Zhang | ............... | H04W 68/08 |
| 2019/0342936 A1* | 11/2019 | Wu | ............... | H04W 76/10 |
| 2020/0137564 A1* | 4/2020 | Liu | ............... | H04W 36/08 |
| 2020/0229049 A1* | 7/2020 | Wu | ............... | H04W 76/12 |
| 2020/0374947 A1* | 11/2020 | Jin | ............... | H04W 88/085 |
| 2020/0383164 A1* | 12/2020 | Kim | ............... | H04W 76/12 |
| 2021/0007170 A1* | 1/2021 | Liu | ............... | H04W 76/27 |
| 2021/0185755 A1* | 6/2021 | Kim | ............... | H04W 68/005 |
| 2022/0030489 A1* | 1/2022 | Sharma | ............... | H04W 76/27 |
| 2022/0086944 A1* | 3/2022 | Kim | ............... | H04W 76/34 |
| 2022/0232669 A1* | 7/2022 | Yang | ............... | H04W 76/14 |
| 2022/0264392 A1* | 8/2022 | Chen | ............... | H04L 5/0051 |
| 2022/0279345 A1* | 9/2022 | Kim | ............... | H04W 12/106 |
| 2022/0342028 A1* | 10/2022 | Sun | ............... | H04L 5/0051 |
| 2022/0346179 A1* | 10/2022 | Yang | ............... | H04W 76/27 |

FOREIGN PATENT DOCUMENTS

| | | | |
|---|---|---|---|
| CN | 110139386 A | 8/2019 | |
| CN | 110139387 A | 8/2019 | |
| EP | 3595363 A1 | 1/2020 | |
| WO | 2018171518 A1 | 9/2018 | |
| WO | 2019098900 A1 | 5/2019 | |
| WO | 2019242756 A1 | 12/2019 | |

OTHER PUBLICATIONS

"3rd Generation Partnership Project; Technical Specification Group Radio Access Network; NG-RAN; F1 application protocol (F1AP) (Release 15)," 3GPP TS 38.473 V15.7.0, total 221 pages, 3rd Generation Partnership Project, Valbonne, France (Sep. 2019).

\* cited by examiner

CONTEXT MANAGEMENT METHOD AND APPARATUS

CROSS-REFERENCE TO RELATED APPLICATIONS

This application is a continuation of International Application No. PCT/CN2019/130987, filed on Dec. 31, 2019, the disclosure of which is hereby incorporated by reference in its entirety.

TECHNICAL FIELD

This application relates to the field of wireless communication technologies, and in particular, to a context management method and an apparatus.

BACKGROUND

In a current communication system, for example, a long term evolution (LTE) system or a new radio (NR) system, after a terminal side device accesses a network side device, the network side device can establish a corresponding context for the terminal side device. When the terminal side device is switched from a radio resource control (RRC) connected state to an RRC idle state, the network side device releases the context of the terminal side device. In addition, in the NR system, an inactive state (which may also be referred to as a third state) is introduced into RRC states of the terminal side device. In the inactive state, the terminal side device can maintain a connection to a core network, but does not perform operations such as cell handover, uplink timing update, and radio link monitoring. When the terminal side device is switched from the RRC connected state to the inactive state, the terminal side device stores a part of the context. When the terminal side device is switched from the inactive state to the RRC connected state, the network side device notifies the terminal side device to restore the stored context.

In the NR system and the LTE system, the network side device may include a centralized unit (CU) and a distributed unit (DU). Some functions of the network side device are deployed on one CU, and the remaining functions are deployed on the DU, where a plurality of DUs may share one CU, to reduce costs and facilitate network expansion. For the network side device having a CU-DU architecture, the CU of the network side device is responsible for managing the RRC state of the terminal side device. Therefore, when the RRC state of the terminal side device changes, the CU of the network side device needs to notify the DU of the network side device to perform coordinated context processing. Specifically, in a process in which the terminal side device is switched from the RRC connected state to the inactive state, the CU of the network side device notifies the DU of the network side device to release the context of the terminal side device, including all dedicated F1 transmission resources, air interface configuration information, and the like.

However, if the DU of the network side device releases the context of the terminal side device, when the terminal side device in the inactive state sends uplink data to the DU of the network side device, the DU of the network side device cannot immediately send the data to the CU of the network side device. The DU of the network side device can send the uplink data to the CU of the network side device only after a context establishment process is completed. Consequently, an uplink data transmission latency is increased, and power consumption of the terminal side device is increased.

SUMMARY

An objective of embodiments of this application is to provide a context management method and an apparatus, to resolve a problem of how to reduce an uplink data transmission latency of a terminal side device in an inactive state.

According to a first aspect, this application provides a context management method. The method includes: A distributed unit DU of a network side device receives a first message from a centralized unit CU of the network side device, where the first message includes a second message, and the second message is used to indicate a terminal side device to enter an inactive state and release a connection to the network side device. The DU of the network side device stores a context of the terminal side device in the inactive state.

According to the foregoing method, when storing the context of the terminal side device in the inactive state, the DU of the network side device can receive uplink data from the terminal side device in the inactive state based on information such as the context, to reduce overheads and power consumption caused when the terminal side device sends signaling.

In a possible implementation, the first message includes first information, and the first information is used to indicate the DU of the network side device to store an air interface context in the context of the terminal side device. The DU of the network side device stores the air interface context of the terminal side device based on the first information.

In a possible implementation, the first information is further used to indicate the DU of the network side device to store an F1 context in the context of the terminal side device. The F1 context includes a data transmission channel of the terminal side device, and the data transmission channel is an F1 interface-dedicated transmission tunnel corresponding to data radio bearer DRB data of the terminal side device.

Further, when storing the data transmission channel of the terminal side device in the inactive state, the DU of the network side device can immediately transmit the uplink data of the terminal side device in the inactive state to the CU of the network side device, to reduce a data transmission latency. In addition, this can also reduce a latency of monitoring, by the terminal side device, a physical downlink control channel (PDCCH) that responds to the uplink data, so that the power consumption of the terminal side device is further reduced.

In a possible implementation, the first message is an interface message between the CU of the network side device and the DU of the network side device, but is not a user equipment UE context release command message in the interface message.

In a possible implementation, the context includes one or more of the following:
 a configured grant configured for the terminal side device;
 configuration information of a PDCCH configured for the terminal side device;
 a temporary identity for scrambling the PDCCH;
 an inactive radio network temporary identity I-RNTI configured for the terminal side device; and
 configuration information of a radio link control (RLC) layer of a radio bearer configured for the terminal side device.

According to a second aspect, this application further provides a communication apparatus. The communication apparatus has a function of implementing any method provided in the first aspect. The communication apparatus may be implemented by hardware, or may be implemented by hardware executing corresponding software. The hardware or the software includes one or more units or units corresponding to the foregoing function.

In a possible implementation, the communication apparatus includes a processor. The processor is configured to support the communication apparatus in performing a corresponding function of the DU of the network side device in the foregoing method. The communication apparatus may further include a memory. The memory may be coupled to the processor, and stores program instructions and data that are necessary for the communication apparatus. Optionally, the communication apparatus further includes a communication interface. The communication interface is configured to support communication between the communication apparatus and a device such as a CU of a network side device.

In a possible implementation, the communication apparatus includes corresponding function units, respectively configured to implement the steps in the foregoing method. The function may be implemented by hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method examples. For details, refer to the descriptions in the method according to the first aspect. Details are not described herein again.

According to a third aspect, this application provides a context management method. The method includes:

A centralized unit CU of a network side device generates a first message when determining that a terminal side device enters an inactive state, where the first message includes a second message, and the second message is used to indicate the terminal side device to enter the inactive state and release a connection to the network side device.

The CU of the network side device sends the first message to a distributed unit DU of the network side device, where the first message is used to indicate the DU of the network side device to store a context of the terminal side device in the inactive state.

In a possible implementation, the first message includes first information, and the first information is used to indicate the DU of the network side device to store an air interface context of the terminal side device.

In a possible implementation, the first information is further used to indicate the DU of the network side device to store an F1 context of the terminal side device. The F1 context includes a data transmission channel of the terminal side device, and the data transmission channel is an F1 interface-dedicated transmission tunnel corresponding to data radio bearer DRB data of the terminal side device.

In a possible implementation, the first message is an F1 application layer F1AP message, but is not a context release command message in the F1AP message.

In a possible implementation, the context includes one or more of the following:

a configured grant configured for the terminal side device;
configuration information of a PDCCH configured for the terminal side device;
a temporary identity for scrambling the PDCCH;
an inactive radio network temporary identity I-RNTI configured for the terminal side device;
configuration information of an RLC layer of a radio bearer configured for the terminal side device; and
configuration information of a MAC layer configured for the terminal side device.

According to a fourth aspect, this application further provides a communication apparatus. The communication apparatus has a function of implementing any method provided in the third aspect. The communication apparatus may be implemented by hardware, or may be implemented by hardware executing corresponding software. The hardware or the software includes one or more units or units corresponding to the foregoing function.

In a possible implementation, the communication apparatus includes a processor. The processor is configured to support the communication apparatus in performing a corresponding function of the CU of the network side device in the foregoing method. The communication apparatus may further include a memory. The memory may be coupled to the processor, and stores program instructions and data that are necessary for the communication apparatus. Optionally, the communication apparatus further includes a communication interface. The communication interface is configured to support communication between the communication apparatus and a device such as a DU of a network side device.

In a possible implementation, the communication apparatus includes corresponding function units, respectively configured to implement the steps in the foregoing method. The function may be implemented by hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method examples. For details, refer to the descriptions in the method according to the third aspect. Details are not described herein again.

According to a fifth aspect, this application provides a context management method. The method includes: A distributed unit DU of a network side device receives capability information from a centralized unit CU of the network side device, where the capability information is used to indicate a capability of a terminal side device. When the DU of the network side device determines, based on the capability information, that the terminal side device is in an inactive state and has a capability of transmitting uplink information on a configured grant, the DU of the network side device stores a context of the terminal side device in the inactive state.

According to the foregoing method, when storing the context of the terminal side device in the inactive state, the DU of the network side device can receive uplink data from the terminal side device in the inactive state based on information such as the context, to reduce overheads and power consumption caused when the terminal side device sends signaling.

In a possible implementation, the DU of the network side device stores an air interface context in the context of the terminal side device.

In a possible implementation, the DU of the network side device stores an F1 context in the context of the terminal side device. The F1 context includes a data transmission channel of the terminal side device, and the data transmission channel is an F1 interface-dedicated transmission tunnel corresponding to data radio bearer DRB data of the terminal side device.

Further, when storing the data transmission channel of the terminal side device in the inactive state, the DU of the network side device can immediately transmit the uplink data of the terminal side device in the inactive state to the CU of the network side device, to reduce a data transmission latency. In addition, this can also reduce a latency of monitoring, by the terminal side device, a PDCCH that responds to the uplink data, so that the power consumption of the terminal side device is further reduced.

In a possible implementation, the context includes one or more of the following:
- a configured grant configured for the terminal side device;
- configuration information of a PDCCH configured for the terminal side device;
- a temporary identity for scrambling the PDCCH;
- an inactive radio network temporary identity I-RNTI configured for the terminal side device; and
- configuration information of an RLC layer of a radio bearer configured for the terminal side device.

According to a sixth aspect, this application further provides a communication apparatus. The communication apparatus has a function of implementing any method provided in the fifth aspect. The communication apparatus may be implemented by hardware, or may be implemented by hardware executing corresponding software. The hardware or the software includes one or more units or units corresponding to the foregoing function.

In a possible implementation, the communication apparatus includes a processor. The processor is configured to support the communication apparatus in performing a corresponding function of the DU of the network side device in the foregoing method. The communication apparatus may further include a memory. The memory may be coupled to the processor, and stores program instructions and data that are necessary for the communication apparatus. Optionally, the communication apparatus further includes a communication interface. The communication interface is configured to support communication between the communication apparatus and a device such as a CU of a network side device.

In a possible implementation, the communication apparatus includes corresponding function units, respectively configured to implement the steps in the foregoing method. The function may be implemented by hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method examples. For details, refer to the descriptions in the method according to the fifth aspect. Details are not described herein again.

According to a seventh aspect, this application provides a communication apparatus. The communication apparatus includes a processor. When the processor executes a computer program or instructions in a memory, the method according to the first aspect, the third aspect, or the fifth aspect is performed.

According to an eighth aspect, this application provides a communication apparatus. The communication apparatus includes a processor and a memory. The memory is configured to store a computer program or instructions, and the processor is configured to execute the computer program or the instructions stored in the memory, to enable the communication apparatus to perform the corresponding method according to the first aspect, the third aspect, or the fifth aspect.

According to a ninth aspect, this application provides a communication apparatus. The communication apparatus includes a processor, a memory, and a transceiver. The transceiver is configured to receive a signal or send a signal, the memory is configured to store a computer program or instructions, and the processor is configured to invoke the computer program or the instructions from the memory, to perform the method according to the first aspect, the third aspect, or the fifth aspect.

According to a tenth aspect, this application provides a communication apparatus. The communication apparatus includes a processor and an interface circuit. The interface circuit is configured to receive code instructions and transmit the code instructions to the processor, and the processor runs the code instructions to perform the corresponding method according to the first aspect, the third aspect, or the fifth aspect.

According to an eleventh aspect, this application provides a computer-readable storage medium. The computer-readable storage medium is configured to store a computer program or instructions. When a computer reads and executes the computer program or the instructions, the method according to the first aspect, the third aspect, or the fifth aspect is implemented.

According to a twelfth aspect, this application provides a computer program product including instructions. When a computer reads and executes the computer program product, the method according to the first aspect, the third aspect, or the fifth aspect is implemented.

According to a thirteenth aspect, this application provides a chip. The chip includes a processor. The processor is coupled to a memory, and is configured to execute a computer program or instructions stored in the memory. When the processor executes the computer program or the instructions, the method according to the first aspect, the third aspect, or the fifth aspect is implemented.

According to a fourteenth aspect, this application provides a system. The system includes the communication apparatus according to the second aspect and the communication apparatus according to the fourth aspect.

DESCRIPTION OF EMBODIMENTS

The following further describes in detail embodiments of this application with reference to the accompanying drawings.

Technical solutions in embodiments of this application may be applied to various communication systems, for example, a 5th generation mobile communication (5G) system (for example, new radio (NR)), a long term evolution (LTE) system, an LTE frequency division duplex (FDD) system, and an LTE time division duplex (TDD) system. This is not limited herein.

A terminal side device in embodiments of this application may be a device having a wireless transceiver function or a chip that can be disposed in any device, or may also be referred to as user equipment (UE), an access terminal, a subscriber unit, a subscriber station, a mobile station, a remote station, a remote terminal, a mobile device, a user terminal, a wireless communication device, a user agent, or a user apparatus. The terminal side device in embodiments of this application may be a mobile phone, a pad, a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like.

A network side device may be an evolved NodeB (eNB) in an LTE system, a next generation NodeB (gNB) in an NR system, or the like.

Figure 1:
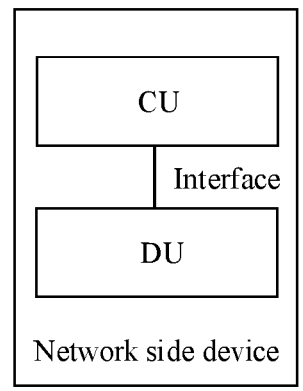
FIG. 1 is a schematic diagram of a structure of a network side device applicable to embodiments of this application.

As shown in FIG. 1, in embodiments of this application, a network side device may include a centralized unit (CU) and a distributed unit (DU). Some functions of the network side device are deployed on one CU, and the remaining functions are deployed on the DU, where a plurality of DUs may share one CU. For the network side device having a CU-DU architecture, the CU of the network side device is responsible for managing an RRC state of the terminal side device.

Figure 2:
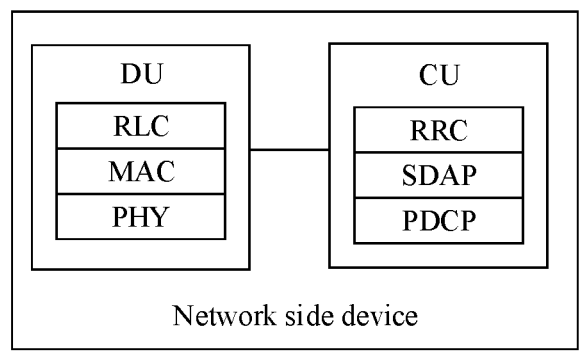
FIG. 2 is a schematic diagram of a structure of a protocol stack according to an embodiment of this application.

In embodiments of this application, when a network side device is a device that supports the NR system, division between a CU of the network side device and a DU of the network side device based on a protocol stack may be shown in FIG. 2. In FIG. 2, a radio resource control (RRC) layer, a service data adaptation protocol (SDAP) layer, and a packet data convergence protocol (PDCP) layer are deployed on the CU of the network side device. A radio link control (RLC) layer, a media access control (MAC) layer, and a physical (PHY) layer are deployed on the DU of the network side device.

Figure 3:
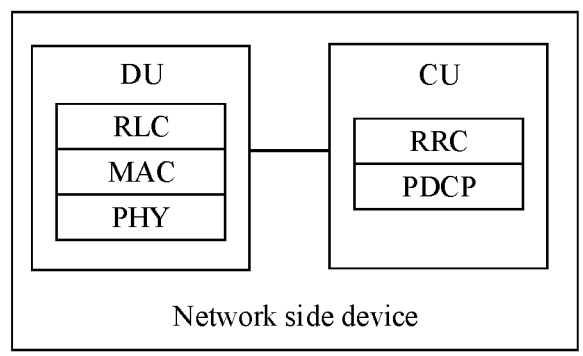
FIG. 3 is another schematic diagram of a structure of a protocol stack according to an embodiment of this application.

When a network side device is a device that supports the LTE system, division between a CU of the network side device and a DU of the network side device based on a protocol stack may be shown in FIG. 3. In FIG. 3, an RRC layer and a PDCP layer are deployed on the CU of the network side device. An RLC layer, a MAC layer, and a physical layer are deployed on the DU of the network side device.

The foregoing described protocol layer division is merely an example, and it will be appreciated that division may be performed at another protocol layer.

Figure 4:
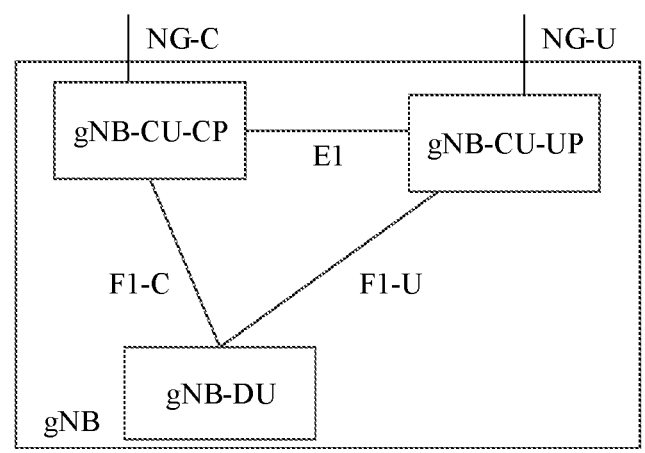
FIG. 4 is another schematic diagram of a structure of a network side device applicable to embodiments of this application.

Further, as shown in FIG. 4, compared with the architecture shown in FIG. 1, a CU of a network side device may alternatively be in a form in which a control plane (CP) and a user plane (UP) are separated. In other words, the CU may be divided into two logical network elements: a CU-CP and a CU-UP. Currently, an interface between the CU and a DU in the LTE system is named as a W1 interface, and an interface between the CU and the DU in the NR system is named as an F1 interface. Functions of the two interfaces are similar. In FIG. 4, an example in which the network side device is a gNB in the NR system is used for description. The F1 interface includes the control plane (CP) and the user plane (UP). A transport layer protocol of the control plane is a stream control transmission protocol (SCTP), and a transmitted message is an F1 application protocol (F1AP) message. A transport layer protocol of the user plane is a general packet radio service (GPRS) tunneling protocol user plane (GTP-U).

An interface between the CU-CP and the CU-UP is named as E1, and is for transmitting signaling between the CU-CP and the CU-UP. An F1-C interface between the CU-CP and the DU is for transmitting F1 signaling between the CU-CP and the DU and RRC signaling of a terminal side device. An F1-U interface between the CU-CP and the DU is for transmitting data radio bearer (DRB) data. After receiving uplink data carried on a DRB through an air interface of the DU, the DU processes the data at a physical layer, a MAC layer, and an RLC layer, and then sends the data of the DRB to the CU through the F1-U interface. After receiving an RRC message sent by the terminal side device through the air interface, the DU processes the message at the physical layer, the MAC layer, and the RLC layer that are of the DU, and then sends the RRC message to the CU through the F1-CP interface.

In the foregoing network architecture, signaling generated by the CU may be sent to the terminal side device via the DU, and the DU may transparently transmit the signaling to the terminal side device without parsing the signaling. Correspondingly, signaling generated by the terminal side device may be sent to the CU via the DU, and the DU may transparently transmit the signaling to the CU without parsing the signaling.

As described above, when the CU-DU architecture is used in the network side device, the CU includes the RRC layer, and is responsible for managing the RRC state of the terminal side device. When the RRC state of the terminal side device changes to an inactive state, an embodiment of this application provides a method for processing a context of the terminal side device. The following provides detailed descriptions.

It should be noted that network architectures and service scenarios described in embodiments of this application are intended to describe examples of technical solutions in embodiments of this application more clearly, and do not constitute any limitation on technical solutions provided in embodiments of this application. A person of ordinary skill in the art may know that: with evolution of the network architectures and emergence of new service scenarios, technical solutions provided in embodiments of this application are also applicable to resolving a similar technical problem.

Embodiments of this application mainly relate to how a DU of a network side device determines whether to store a context of a terminal side device. Before the DU of the network side device determines whether to store the context of the terminal side device, a context establishment procedure of the terminal side device may be further included. For details, refer to FIG. 5.

Step 501: The terminal side device sends capability information to a CU of the network side device.

The capability information is used to indicate a capability of the terminal side device. Further, optionally, the capability information is used to indicate that the terminal side device has a capability of transmitting data in an inactive state, and the capability indicates that the terminal side device in the inactive state has a capability of transmitting uplink information on a configured grant or a scheduling grant. The uplink information includes but is not limited to uplink signaling and uplink data. The uplink signaling may be uplink RRC signaling or the like, and the uplink data may be uplink service data, for example, video data or audio data.

It should be noted that the scheduling grant is a resource allocated by the network side device to the terminal side device based on a resource request, where the resource request is sent by the terminal side device. For example, the resource request may be a preamble in a random access process or an uplink scheduling request. The configured grant is a resource pre-configured by the network side device, and is featured by one-time allocation and repeated use, where the terminal side device does not need to send a resource request.

It should be noted that the terminal side device has a plurality of capabilities, and the capability information may alternatively indicate another capability of the terminal side device. This is not limited in embodiments of this application.

Step 502: The CU of the network side device sends a UE context establishment request message to the DU of the network side device.

The UE context establishment request message may be used to request to establish a context for the terminal side device.

Optionally, the UE context establishment request message may include the capability information.

Step 503: The DU of the network side device establishes the context for the terminal side device, and sends a UE context establishment response message to the CU of the network side device.

It should be noted that, in embodiments of this application, the context may include an air interface context and an F1 context.

The air interface context may include an RLC layer configuration, a MAC layer configuration, physical layer configuration information, an I-RNTI, a C-RNTI, or the like of the terminal side device. The air interface context may alternatively include "a configured grant for data transmission in the inactive state", PDCCH configuration information for sending physical layer feedback information, or an RNTI for scrambling a PDCCH. The F1 context may include an F1AP ID, transport layer address information for F1 data transmission, or the like. Transmission of DRB data of the terminal side device between the CU of the network side device and the DU of the network side device may also be referred to as F1 data transmission.

In embodiments of this application, the context established by the DU of the network side device for the terminal side device may include one or more of the following items.

1. Configured grant configured for the terminal side device: The configured grant may be used to indicate an uplink resource allocated to the terminal side device, and the configured grant may include but is not limited to one or more of a frequency domain resource, a periodicity, a start location, and data demodulation reference information that are of a physical uplink shared channel (PUSCH).

Optionally, the configured grant may be configured for the terminal side device in the inactive state, and the terminal side device in the inactive state may send one or both of the uplink RRC signaling and the uplink data by using the configured grant.

Optionally, a time-frequency resource configured by the configured grant may be a time-frequency resource dedicated to the terminal side device, namely, a time-frequency resource that is not shared with another terminal side device. In this case, the DU of the network side device may establish a mapping relationship between the configured grant and the context of the terminal side device and a mapping relationship between the configured grant and a data transmission channel of the terminal side device.

Optionally, a time-frequency resource configured by the configured grant may be a time-frequency resource that is shared by the terminal side device and another terminal side device. In this case, when determining that the terminal side device enters the inactive state, the CU of the network side device may send an inactive radio network temporary identity (I-RNTI) to the DU of the network side device. The DU of the network side device may establish a mapping relationship between the configured grant and an I-RNTI of the terminal side device. The I-RNTI may be a unique identity of the terminal side device in the inactive state in a radio network-based notification area (RNA).

2. Configuration information of a physical downlink control channel (PDCCH) configured for the terminal side device: The configuration information of the PDCCH may be used to send feedback information of uplink data, schedule PUSCH transmission, schedule physical downlink shared channel (PDSCH) transmission, and so on.

The configuration information of the PDCCH includes but is not limited to resource location information, a periodicity, a start location, and the like of the PDCCH.

In embodiments of this application, the PDCCH may schedule sending of physical layer signaling, for example, at least one of acknowledgment (ACK) or negative acknowledgment (NACK) signaling, an uplink grant for initial transmission, and an uplink grant for retransmission. The PDCCH may further schedule sending of a PDSCH, and information carried on the PDSCH includes but is not limited to one or more of downlink RRC signaling, downlink data, and a timing advance command. The terminal side device may perform uplink transmission and downlink transmission based on scheduling of the PDCCH.

3. Temporary identity for scrambling the PDCCH: The temporary identity is a 32-bit radio network temporary identity (RNTI) for scrambling the PDCCH. For example, the temporary identity may be a cell radio network temporary identity (C-RNTI) of the terminal side device.

4. Configuration information of an RLC layer of a radio bearer configured for the terminal side device.

5. Configuration information of a MAC layer configured for the terminal side device.

6. I-RNTI configured for the terminal side device.

It should be noted that the foregoing is merely an example, and the context of the terminal side device may further include other information. This is not limited in embodiments of this application.

For example, the UE context establishment response message sent by the CU of the network side device may include the context of the terminal side device.

Figure 5:
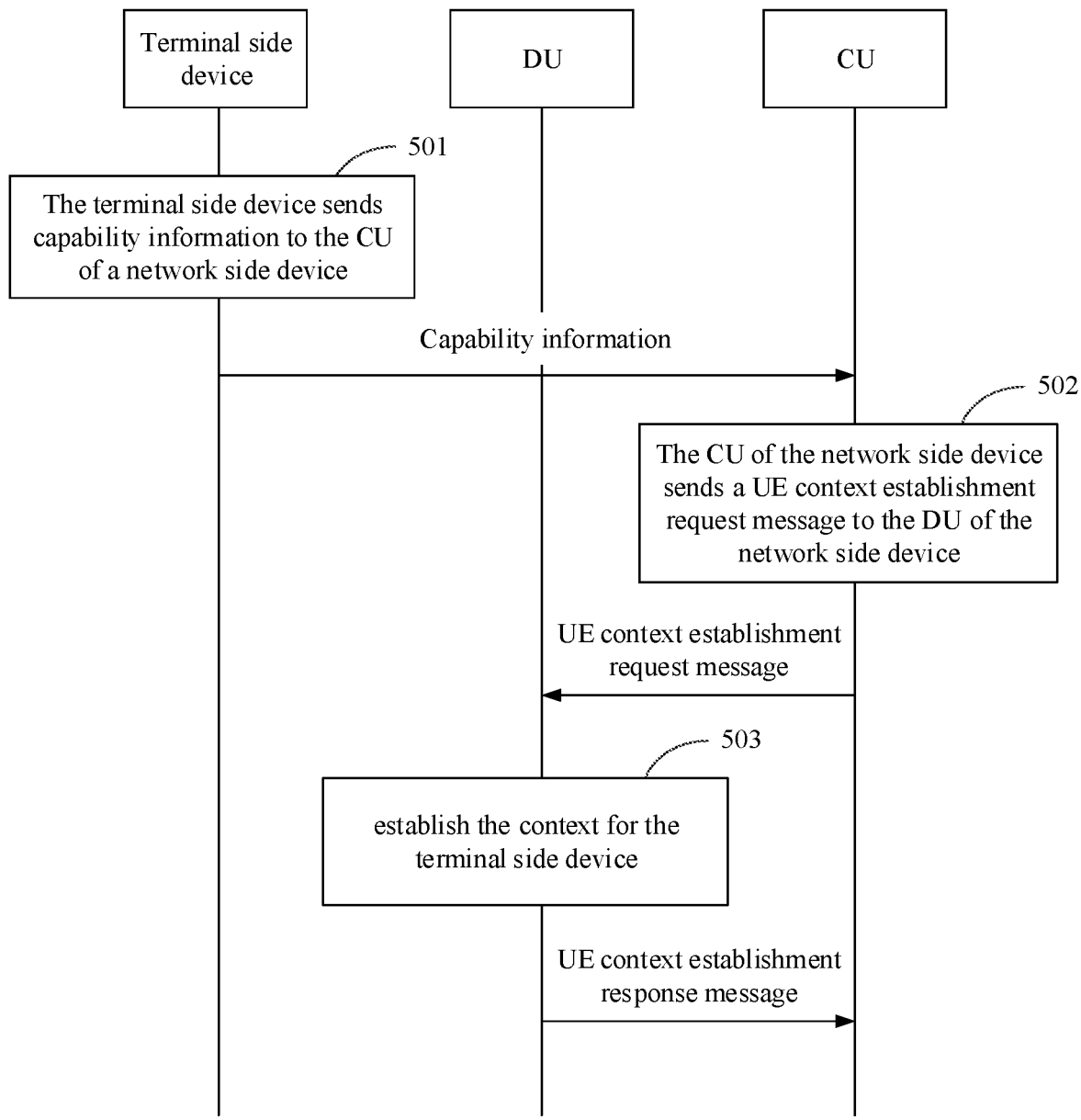
FIG. 5 is a schematic flowchart of context configuration according to an embodiment of this application.

In the procedure shown in FIG. 5, only main steps are described. There may be another step in the process of establishing the context for the terminal side device.

Figure 6:
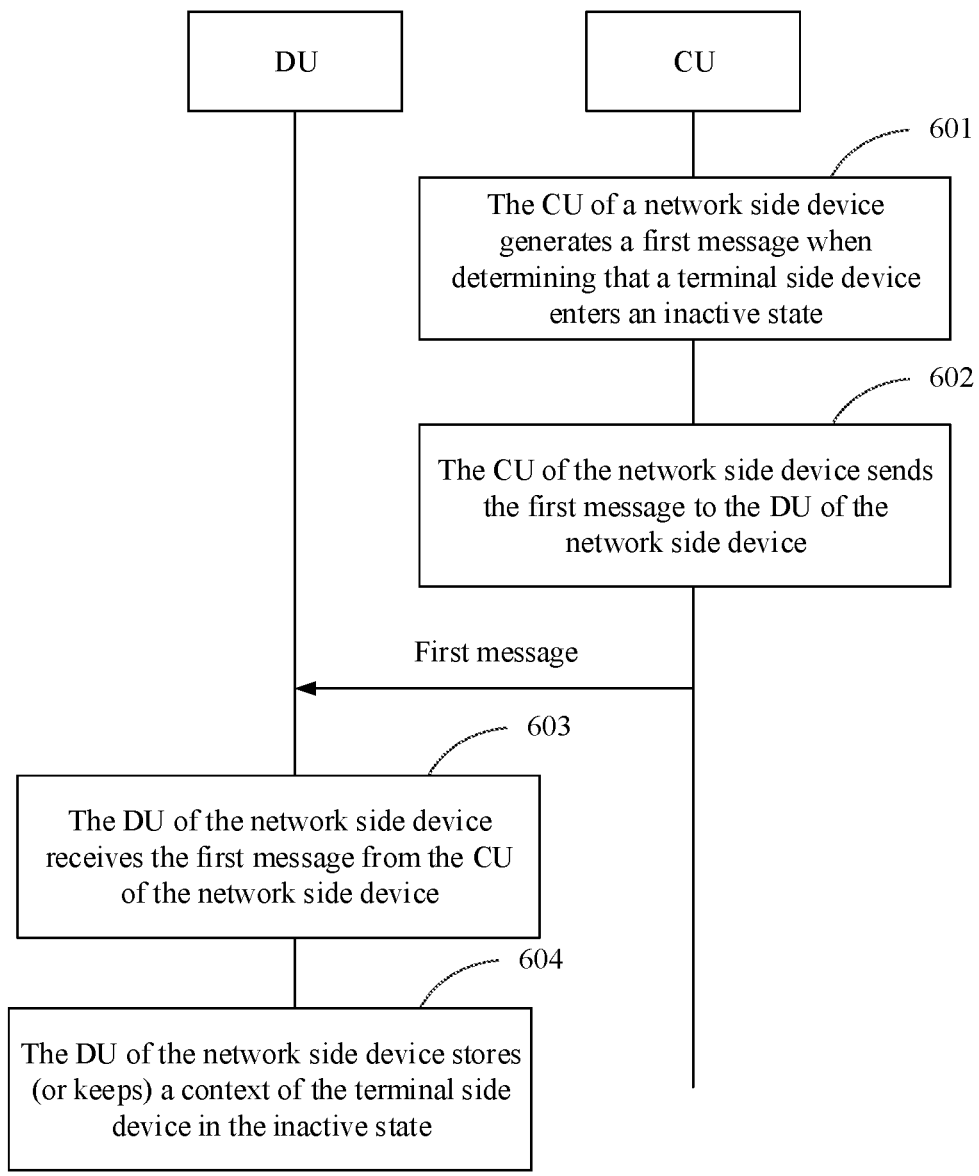
FIG. 6 is a schematic flowchart of a context management method according to an embodiment of this application.

In the procedure shown in FIG. 5, the context of the terminal side device is established. Refer to FIG. 6 for how the network side device processes the context of the terminal side device when the terminal side device enters the inactive state. FIG. 6 is a schematic flowchart of a context management method according to an embodiment of this application. A procedure of the method includes the following steps.

Step 601: A CU of a network side device generates a first message when determining that a terminal side device enters an inactive state.

The first message includes a second message, and the second message is used to indicate the terminal side device to enter the inactive state and release a connection to the network side device. For example, the second message may be an RRC connection release message defined in a 3rd generation partnership project (3GPP) standard.

It should be noted that how the CU of the network side device determines that the terminal side device enters the inactive state is not limited in embodiments of this application. For details, refer to descriptions in the conventional technology. When determining that the terminal side device enters the inactive state, the CU of the network side device may generate the second message such as the RRC connection release message, include the second message in the first message, and send the first message to a DU of the network side device.

In this embodiment of this application, the first message may be an F1AP message. For example, the first message may be a UE context release command message. Alternatively, the first message may be an F1AP message other than a UE context release command message. For example, the first message may be a downlink RRC message transfer message defined in the 3GPP standard.

In this embodiment of this application, the first message may be used to indicate the DU of the network side device to store (or keep) a context of the terminal side device in the inactive state.

Storing a configuration may mean storing a variable in the configuration, where the variable in the configuration may be reset. Keeping a configuration may mean keeping a value of a variable in the configuration unchanged. For example, when a sequence number of a configuration is stored, the sequence number may be reset to 0. When a sequence number of a configuration is kept, the sequence number cannot be reset to 0, but the sequence number can keep unchanged.

Optionally, when determining, based on capability information of the terminal side device, that the terminal side device has a capability of transmitting data in the inactive state, the CU of the network side device indicates, by using the first message, the DU of the network side device to store (or keep) the context of the terminal side device in the inactive state. When determining, based on the capability information of the terminal side device, that the terminal side device does not have the capability of transmitting data in the inactive state, the CU of the network side device may indicate, without using the first message, the DU of the network side device to store (or keep) the context of the terminal side device in the inactive state.

In this embodiment of this application, the first message may be implemented in a plurality of manners. In a first possible implementation, the first message may include first information, and the first information is used to indicate the DU of the network side device to store (or keep) the context of the terminal side device.

The first information is implemented in a plurality of manners. For example, the first information may be an I-RNTI of the terminal side device. When determining that the first message includes the I-RNTI, the DU of the network side device may determine to store (or keep) the context of the terminal side device.

For another example, the first information may alternatively be inactive state information of the terminal side device, and the inactive state information is used to indicate that the terminal side device is in the inactive state. When the DU of the network side device determines that the first message includes the inactive state information, and determines, based on the inactive state information, that the terminal side device is in the inactive state, the DU of the network side device may determine to store (or keep) the context of the terminal side device.

For another example, the first information may alternatively be a dedicated storing indication, for example, a bit. When a value of the bit is 1, it indicates to store (or keep) of the context of the terminal side device. When determining that the value of the bit corresponding to the dedicated storing indication is 1, the DU of the network side device stores (or keeps) the context of the terminal side device.

Optionally, when determining, based on the capability information of the terminal side device, that the terminal side device has the capability of transmitting data in the inactive state, the CU of the network side device includes the first information in the first message.

In this implementation, the first message may be the UE context release command message.

In this implementation, the first message includes the first information, so that the DU of the network side device no longer deletes the context of the terminal side device based on the first information.

Optionally, the first information may be used to indicate the DU of the network side device to store (or keep) a part of content in the context of the terminal side device, for example, indicate the DU of the network side device to store (or keep) one or more of the following items.

1. Configured grant configured for the terminal side device.

Optionally, the CU of the network side device may further indicate a configured grant that is of data transmission corresponding to a specific radio bearer identifier or a specific logical channel identifier and that is to be stored by the DU of the network side device.

Optionally, when a time-frequency resource configured by the configured grant is a time-frequency resource shared by the terminal side device and another terminal side device, the first message may further include the I-RNTI. Therefore, the DU of the network side device may establish a mapping relationship between the I-RNTI of the terminal side device and a data transmission channel of the terminal side device and a mapping relationship between the I-RNTI of the terminal side device and the context of the terminal side device.

2. Configuration information of a PDCCH configured for the terminal side device.

3. Temporary identity for scrambling the PDCCH.

4. Configuration information of an RLC layer of a radio bearer configured for the terminal side device.

5. Configuration information of a MAC layer configured for the terminal side device.

6. Transport layer information of an F1 data transmission channel of the terminal side device such as a transport layer address and a GTP-tunnel endpoint identifier (TEID).

Optionally, the first information may be further used to indicate the DU of the network side device to store (or keep) an F1 context of the terminal side device. The F1 context includes but is not limited to the data transmission channel of the terminal side device. The data transmission channel is an F1 interface-dedicated transmission tunnel corresponding to DRB data of the terminal side device, namely, a GTP tunnel. The DRB data of the terminal side device is transmitted from the DU of the network side device to the CU of the network side device through the data transmission channel. The data transmission channel may also be referred to as the F1 data transmission channel or the like. For ease of description, the data transmission channel is uniformly used below for description.

Further, optionally, the CU of the network side device may alternatively indicate a data transmission channel that is of an F1 interface corresponding to a specific DRB and that is to be stored (or kept) by the DU of the network side device.

In this embodiment of this application, the second message may include all or a part of content in the context of the terminal side device. For example, the second message may include one or more of the following: a configured grant configured for the terminal side device; configuration information of a PDCCH configured for the terminal side device; a temporary identity for scrambling the PDCCH; an I-RNTI configured for the terminal side device; configuration information of an RLC layer of a radio bearer configured for the terminal side device; and configuration information of a MAC layer configured for the terminal side device.

It should be noted that when the DU of the network side device does not store (or does not keep) the configured grant, and/or the second message does not include the configured grant configured for the terminal side device, the terminal side device may send uplink data by using a common time-frequency resource. For example, the terminal side device may select a two-step random access channel (RACH) resource configuration from a broadcast message sent by the network side device, or select a four-step RACH resource configuration, to request a network to schedule an uplink grant, so that the terminal side device performs uplink data transmission based on the selected two-step RACH resource configuration or four-step RACH resource configuration. For details, refer to the following descriptions.

When the DU of the network side device does not store (or does not keep) the configuration information of the PDCCH, and/or the second message does not include the configuration information of the PDCCH configured for the terminal side device, the DU of the network side device may send the PDCCH by using configuration information of a common PDCCH, for example, send the PDCCH by using configuration information of a PDCCH for scheduling sending of a broadcast message or a random access response.

When the DU of the network side device does not store (or does not keep) the temporary identity for scrambling the PDCCH, and/or the second message does not include the temporary identity for scrambling the PDCCH, the PDCCH may be scrambled by using a common RNTI or an RNTI that is for scrambling the PDCCH and that is derived based on a RACH resource or a configured grant.

When the DU of the network side device does not store (or does not keep) the configuration information of the RLC layer, and/or the second message does not include the configuration information of the RLC layer, the DU of the network side device may use configuration information of a common RLC layer.

When the DU of the network side device does not store (or does not keep) the configuration information of the MAC layer, and/or the second message does not include the configuration information of the MAC layer, the DU of the network side device may use configuration information of a common MAC layer.

When the DU of the network side device does not store (or does not keep) the data transmission channel of the terminal side device, and the DU of the network side device receives the uplink data from the terminal side device, the DU of the network side device may request the CU of the network side device to resume establishment of the data transmission channel of the F1 interface of the terminal side device, and then send the uplink data of the terminal side device to the CU of the network side device through the resumed data transmission channel.

In a second possible implementation, the first message may be implicitly indicated. For example, the first message is the F1AP message other than the UE context release command message. For example, the first message may be the downlink RRC message transfer message.

Optionally, when determining, based on the capability information of the terminal side device, that the terminal side device has the capability of transmitting data in the inactive state, the CU of the network side device implicitly indicates, by using the first message, the DU of the network side device to store an air interface context of the terminal side device.

It should be noted that, in an existing protocol, when receiving a UE context release command message, a DU of a network side device may delete all configuration information of a terminal side device, including information such as a context. In the second possible implementation, the CU of the network side device includes the second message in the F1AP message, such as the downlink RRC message transfer message, other than the UE context release command message. In this case, when receiving a message such as the downlink RRC message transfer message, the DU of the network side device does not delete the information such as the context of the terminal side device, to store (or keep) the air interface context in the context of the terminal side device in the inactive state.

Optionally, in this implementation, the DU of the network side device may store (or keep) all or a part of content in the air interface context of the terminal side device in the inactive state, for example, store (or keep) one or more of the following items.

1. Configuration information of a PDCCH configured for the terminal side device.
2. Temporary identity for scrambling the PDCCH.
3. I-RNTI configured for the terminal side device.
4. Configuration information of an RLC layer of a radio bearer configured for the terminal side device.
5. Configuration information of a MAC layer configured for the terminal side device.

For details of the foregoing content, refer to the descriptions in the first possible implementation. The details are not described herein again.

It should be noted that when the DU of the network side device does not store (or does not keep) any one of the foregoing items, reference may be made to the descriptions in the first possible implementation. Details are not described herein again.

Optionally, in this implementation, the DU of the network side device may alternatively store (or keep) a data transmission channel of the terminal side device.

Further, optionally, the DU of the network side device may alternatively store (or keep) a data transmission channel of an F1 interface corresponding to all or a part of DRBs of the terminal side device. A data transmission channel that is of an F1 interface corresponding to a specific DRB and that is to be stored (or kept) may be determined based on an actual situation. This is not limited herein.

Step 602: The CU of the network side device sends the first message to the DU of the network side device.

Step 603: The DU of the network side device receives the first message from the CU of the network side device.

Step 604: The DU of the network side device stores (or keeps) the context of the terminal side device in the inactive state.

As described above, in the first possible implementation, when the first message includes the first information, the DU of the network side device stores (or keeps) the air interface context of the terminal side device in the inactive state based on the first information. The DU of the network side device may alternatively store (or keep) the F1 context of the terminal side device in the inactive state. For details, refer to the descriptions of step 601. The details are not described herein again.

In the second possible implementation, when the first message does not include the first information, and the DU of the network side device determines that the first message is not the UE context release command message, the DU of the network side device stores (or keeps) the air interface context of the terminal side device in the inactive state. The DU of the network side device may alternatively store (or keep) the F1 context of the terminal side device in the inactive state.

For details of how the DU of the network side device stores (or keeps) the context of the terminal side device in the inactive state, refer to the descriptions in the foregoing steps. The details are not described herein again.

Optionally, when the time-frequency resource configured by the configured grant in the context of the terminal side device is a time-frequency resource dedicated to the terminal side device, the DU of the network side device may establish a mapping relationship between the configured grant and the context of the terminal side device and a mapping relationship between the configured grant and the data transmission channel of the terminal side device.

Optionally, when the time-frequency resource configured by the configured grant in the context of the terminal side device is a time-frequency resource shared by the terminal side device and another terminal side device, the first message may include the I-RNTI configured for the terminal side device. The DU of the network side device may establish a mapping relationship between the I-RNTI of the terminal side device and the data transmission channel of the terminal side device and a mapping relationship between the I-RNTI of the terminal side device and the context of the terminal side device.

In the procedure shown in FIG. 6, only main steps are described, and there may be another step, for example, step 605.

Step 605: The DU of the network side device sends a third message to the CU of the network side device.

The third message may be a response message of the first message. For example, when the first message is the UE context release command message defined in the 3GPP standard, the third message may be a UE context release complete message defined in the 3GPP standard.

In the procedure shown in FIG. 6, when storing (or keeping) the context of the terminal side device in the inactive state, the DU of the network side device can receive the uplink data from the terminal side device in the inactive state based on the information such as the context, to reduce overheads and power consumption caused when the terminal side device sends signaling.

Further, when storing (or keeping) the data transmission channel of the terminal side device in the inactive state, the DU of the network side device can immediately transmit the uplink data of the terminal side device in the inactive state to the CU of the network side device, to reduce a data transmission latency. In addition, this can also reduce a latency of monitoring, by the terminal side device, a PDCCH that responds to the uplink data, so that the power consumption of the terminal side device is further reduced.

Figure 7:
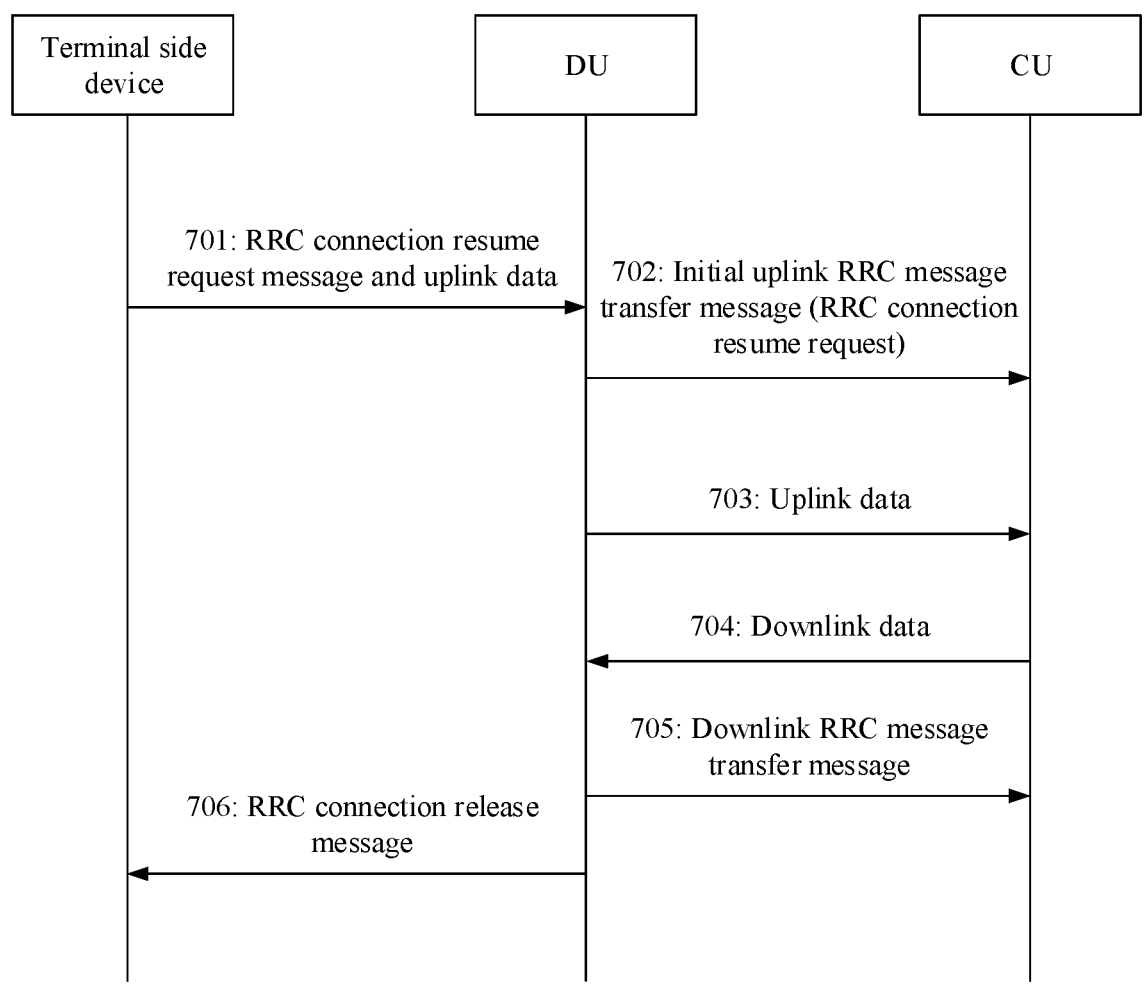
FIG. 7 is a schematic flowchart of data transmission according to an embodiment of this application.

After the DU of the network side device stores (or keeps) at least one of the air interface context of the terminal side device and the data transmission channel of the terminal side device, the uplink data of the terminal side device may be processed according to a procedure shown in FIG. 7. In the procedure shown in FIG. 7, an example in which a CU of a network side device sends a configured grant configured by a DU of the network side device to a terminal side device is used for description.

Step 701: The terminal side device in an inactive state sends an RRC connection resume request message and uplink data carried on a DRB to the DU of the network side device.

Specific content of the uplink data carried on the DRB is not limited in this embodiment of this application.

It should be noted that the terminal side device may send, by using the configured grant, at least one of the RRC connection resume request message and the uplink data carried on the DRB. Alternatively, the terminal side device may separately send the RRC connection resume request message and the uplink data carried on the DRB. For example, the terminal side device may send, in different time periods by using a configured grant in a same frequency domain resource, the RRC connection resume request message and the uplink data carried on the DRB. Alternatively, the terminal side device may separately send, by using two configured grants obtained in a two-step random access process, the RRC connection resume request message and the uplink data carried on the DRB. Alternatively, the terminal side device may send the RRC connection resume request message by using a scheduling grant obtained in a four-step random access process, and send the uplink data carried on the DRB by using an obtained configured grant.

Step 702: When the DU of the network side device receives the RRC connection resume request message and the uplink data carried on the DRB from the terminal side device, a MAC layer entity in the DU of the network side device may obtain the RRC connection resume request message and the uplink data carried on the DRB. The DU of the network side device may send an initial uplink RRC message transfer message to the CU of the network side device, where the initial uplink RRC message transfer message carries the "RRC connection resume request" message.

Step 703: The DU of the network side device transmits the uplink data carried on the DRB to the CU of the network side device through a data transmission channel corresponding to the uplink data carried on the DRB.

With reference to the foregoing descriptions, when a time-frequency resource configured by the configured grant is a time-frequency resource dedicated to the terminal side device, the DU of the network side device may determine a data transmission channel mapped to the configured grant, to transmit, to the CU of the network side device through the data transmission channel mapped to the configured grant, the uplink data carried on the DRB.

When the time-frequency resource configured by the configured grant is a time-frequency resource shared by the terminal side device and another terminal side device, the RRC connection resume request message may include an I-RNTI of the terminal side device. The DU of the network side device may determine a data transmission channel mapped to the I-RNTI, to transmit, to the CU of the network side device through the data transmission channel mapped to the I-RNTI, the uplink data carried on the DRB.

Optionally, if the CU of the network side device needs to send downlink data to the terminal side device, step 704 may be further included.

Step 704: The CU of the network side device sends downlink data carried on the DRB to the DU of the network side device.

Step 705: The CU of the network side device sends a downlink RRC message transfer message to the DU of the network side device.

Step 706: The DU of the network side device sends an RRC connection release message to the terminal side device.

The RRC connection release message and the downlink data carried on the DRB may be sent to the DU of the network side device by using a same transport block, and then the DU of the network side device sends the RRC connection release message and the downlink data carried on the DRB to the terminal side device at the same time.

Alternatively, the RRC connection release message and the downlink data carried on the DRB may be separately sent to the DU of the network side device in different time periods, and then the DU of the network side device separately sends the RRC connection release message and the downlink data carried on the DRB to the terminal side device.

FIG. 7 is merely an example. There may be another step in an actual process.

In another implementation, if the CU of the network side device does not send a configured grant configured by the DU of the network side device to the terminal side device, when the terminal side device sends uplink data, the terminal side device may determine a RACH resource configuration by using a broadcast message. Specifically, in an implementation 1, the terminal side device may select a two-step random access channel (RACH) resource configuration from a broadcast message sent by the network side device. The two-step RACH resource configuration includes a RACH time-frequency resource, a preamble identifier, and a random access configured grant. The terminal side device may send the uplink data to the DU of the network side device on the random access configured grant, and the terminal side device sends, on the RACH resource, a preamble corresponding to the preamble identifier. A preamble and a random access configured grant are in one-to-one or many-to-one correspondence. That is, after sending a preamble, the terminal side device may send the uplink data on a random access configured grant corresponding to the preamble.

In an implementation 2, the terminal side device may select a four-step RACH resource configuration from a broadcast message sent by the network side device. The terminal side device may send a preamble to the DU of the network side device based on the four-step RACH resource configuration, and receive a random access response of the DU of the network side device. The random access response includes a PUSCH resource, timing advance information, and the like. The PUSCH resource is a resource used by the terminal side device to send a message 3. The terminal side device may send the uplink data by using the resource of the message 3. It should be noted that the message 3 herein is a message 3 in the random access process.

For a process after the terminal side device sends the uplink data, refer to the descriptions in step 702 to step 706. Details are not described herein again.

In the foregoing procedure shown in FIG. 6, the first message is used to indicate the DU of the network side device to store (or keep) the context of the terminal side device in the inactive state. In a method further provided in an embodiment of this application, a DU of a network side device may be indicated, without using a first message, to store (or keep) a context of a terminal side device in an inactive state. For details, refer to FIG. 8.

Step 801: The DU of the network side device receives capability information from a CU of the network side device.

The capability information is used to indicate a capability of the terminal side device.

Step 802: When the DU of the network side device determines, based on the capability information, that the terminal side device is in the inactive state and has a capability of transmitting uplink information on a configured grant or a scheduling grant, the DU of the network side device stores (or keeps) the context of the terminal side device in the inactive state.

For specific content of the context of the terminal side device, refer to the descriptions in the procedures in FIG. 5 and FIG. 6. Details are not described herein again.

Optionally, the DU of the network side device may store (or keep) a part of the context of the terminal side device. For example, the DU of the network side device may store (or keep) an air interface context in the context of the terminal side device, or a part of content in the air interface context. For another example, the DU of the network side device may alternatively store (or keep) an F1 context in the context of the terminal side device, or a part of content in the F1 context. For details, refer to the descriptions in the procedure in FIG. 6. The details are not described herein again.

The DU of the network side device may alternatively perform other content. For details, refer to the part related to the DU of the network side device in the procedures in FIG. 5, FIG. 6, and FIG. 7. The details are not described herein again.

In the foregoing possible implementations, the DU of the network side device stores (or keeps) the air interface context and the F1 context of the terminal side device in the inactive state, to reduce a data transmission latency of the terminal side device in the inactive state. In another embodiment of this application, a DU of a network side device may not store (or not keep) an air interface context and an F1 context of a terminal side device in an inactive state. A CU of the network side device keeps an air interface configuration such as an RLC layer configuration. The DU of the network side device sends data to the CU of the network side device through a common channel, and the CU of the network side device performs RLC processing on the data. Detailed descriptions are provided as follows. The common channel may be an F1 data transmission channel shared by a plurality of terminal side devices served by the DU of the network side device.

Step 1: The DU of the network side device receives a message 1 from the CU of the network side device through an F1 interface.

The message 1 may be a "UE context release command message", a "downlink RRC message transfer message", a "UE context modification request message", or the like.

Optionally, the message 1 may carry configuration request information that is used to request at least one of an RLC layer configuration and a MAC layer configuration that correspond to a data radio bearer of the terminal side device, where the RLC layer configuration includes a plurality of radio bearer identifiers.

The RLC layer configuration may be configuration information of an RLC layer. The MAC layer configuration may be configuration information of a MAC layer.

Further, the configuration request information may further indicate a requested radio bearer identifier (or requested radio bearer identifiers) in the RLC layer configuration.

The message 1 may further carry an "RRC connection release message". In this case, step 2 is further included.

Optionally, in step 2, the DU of the network side device sends the RRC connection release message to the terminal side device.

Step 3: The DU of the network side device sends a message 2 to the CU of the network side device.

For example, when the message 1 is the "UE context release command message", the message 2 may be a "UE context release complete message".

The message 2 may include at least one of the RLC layer configuration and the MAC layer configuration that correspond to the data radio bearer of the terminal side device.

Optionally, when the message 1 is the "UE context release command message", the message 2 includes at least the RLC layer configuration corresponding to the data radio bearer of the terminal side device.

Step 4: When receiving the message 2, the CU of the network side device may set a variable in an RLC entity to an initial value.

In the foregoing procedure, the CU of the network side device can obtain the RLC layer configuration on the DU of the network side device. When receiving uplink data of the terminal side device, the DU of the network side device may send the uplink data of the terminal side device to the CU of the network side device through the following procedure.

Step 901: A terminal side device in an inactive state sends an RRC connection resume request message and uplink data carried on a DRB to a DU of a network side device.

Step 902: When the DU of the network side device receives the RRC connection resume request message and the uplink data carried on the DRB from the terminal side device, the DU of the network side device transmits, by using an F1 message, the uplink data carried on the DRB to a CU of the network side device.

The F1 message may be an initial uplink RRC message transfer message or the like.

It should be noted that the DU of the network side device may alternatively transmit, through a common channel, the uplink data carried on the DRB to the CU of the network side device.

The following only describes an example implementation in which the F1 message is used. The DU of the network side device may send data in two formats.

If the CU of the network side device obtains an RLC layer configuration, the uplink data that is carried on the DRB and that is in the F1 message may include a logical channel identifier and a MAC service data unit (SDU), and may be sent in an RLC protocol data unit (PDU) format.

If the CU of the network side device obtains an RLC layer configuration and a MAC layer configuration, the uplink data that is carried on the DRB and that is in the F1 message may be sent in a MAC PDU format.

It should be noted that the DU of the network side device may include content of the RRC resume request message in the "initial uplink RRC message transfer message".

Optionally, the RRC resume request message and the uplink data carried on the DRB may not be sent to the CU of the network side device in a same F1 message.

Step 903: The CU of the network side device sends a downlink RRC message transfer message to the DU of the network side device after completing data processing.

In correspondence to step 902, a manner in which the CU of the network side device processes the two types of data that may be sent by the DU of the network side device is as follows.

If the CU of the network side device receives an RLC PDU, the CU of the network side device determines the RLC configuration based on the logical channel identifier, and then processes the RLC PDU.

If the CU of the network side device supports a MAC PDU, the CU of the network side device first performs MAC processing to obtain an RLC PDU, and then processes the RLC PDU.

Optionally, the downlink RRC message transfer message may include an air interface message. The air interface message may be another RRC message such as an RRC connection release message, an RRC connection resume message, or an RRC connection reject message.

Optionally, if the CU of the network side device has to-be-sent downlink data, the downlink data may be carried in the downlink RRC message transfer message.

When receiving the content in the RRC resume request message, the CU of the network side device may set the variable in the RLC entity to the initial value.

Step 904: The DU of the network side device sends the RRC connection release message to the terminal side device.

Figure 9:
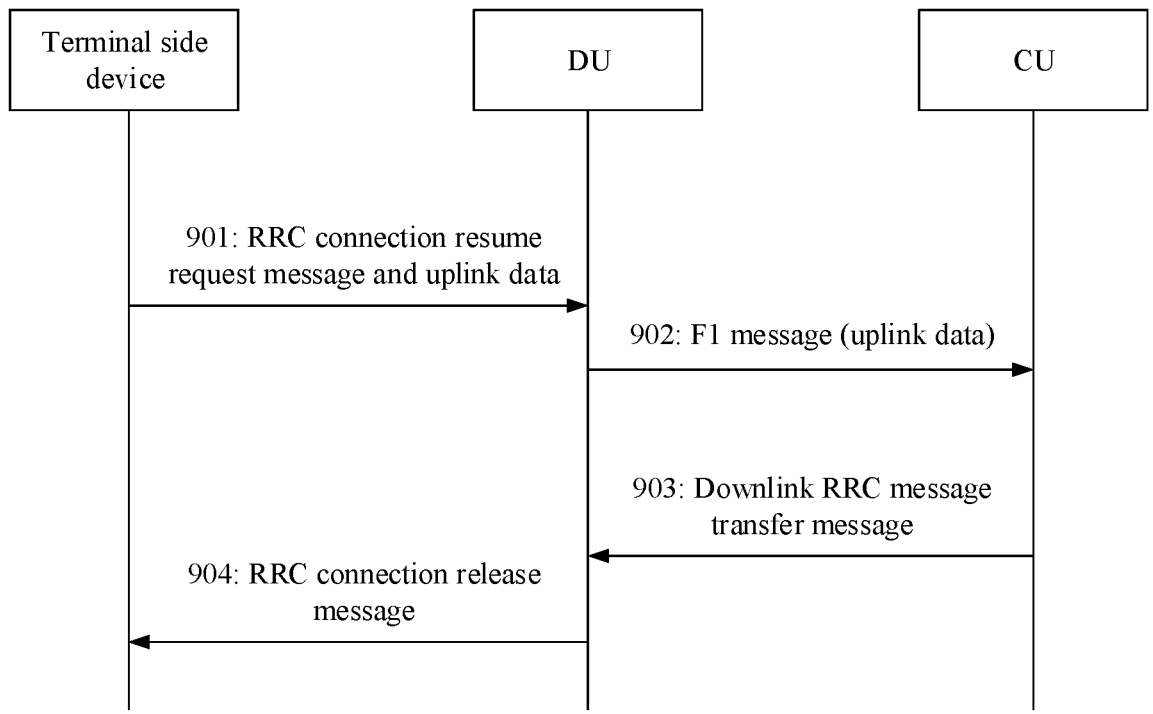
FIG. 9 is a schematic flowchart of data transmission according to an embodiment of this application.

FIG. 9 is merely an example. There may be another step in an actual process.

Embodiments described in this specification may be independent solutions, or may be combined based on internal logic. All these solutions fall within the protection scope of this application.

In the foregoing embodiments provided in this application, the methods provided in embodiments of this application are separately described from a perspective of interaction between devices. To implement functions in the methods provided in the foregoing embodiments of this application, the CU of the network side device or the DU of the network side device may include a hardware structure and/or a software module, and implement the foregoing functions in a form of the hardware structure, the software module, or a combination of the hardware structure and the software module. Whether a specific function in the foregoing functions is performed by using the hardware structure, the software module, or the combination of the hardware structure and the software module depends on particular applications and design constraints of the technical solutions.

In embodiments of this application, division into modules is an example, and is merely logical function division. There may be another division manner during actual implementation. In addition, function modules in embodiments of this application may be integrated into one processor, or each of the modules may exist alone physically, or two or more modules are integrated into one module. The integrated module may be implemented in a form of hardware, or may be implemented in a form of a software function module.

Figure 10:
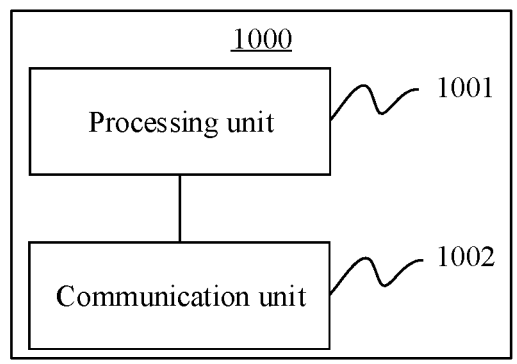
FIG. 10 is a schematic diagram of a structure of a communication apparatus according to an embodiment of this application.

Same as the foregoing concept, as shown in FIG. 10, an embodiment of this application further provides an apparatus 1000, configured to implement a function of the CU of the network side device or the DU of the network side device in the foregoing methods. For example, the apparatus may be a software module or a chip system. In this embodiment of this application, the chip system may include a chip, or may include a chip and another discrete component. The apparatus 1000 may include a processing unit 1001 and a communication unit 1002.

In this embodiment of this application, the communication unit may also be referred to as a transceiver unit, and may include a sending unit and/or a receiving unit, which are respectively configured to perform sending and receiving steps of the CU of the network side device or the DU of the network side device in the foregoing method embodiments.

Figure 11:
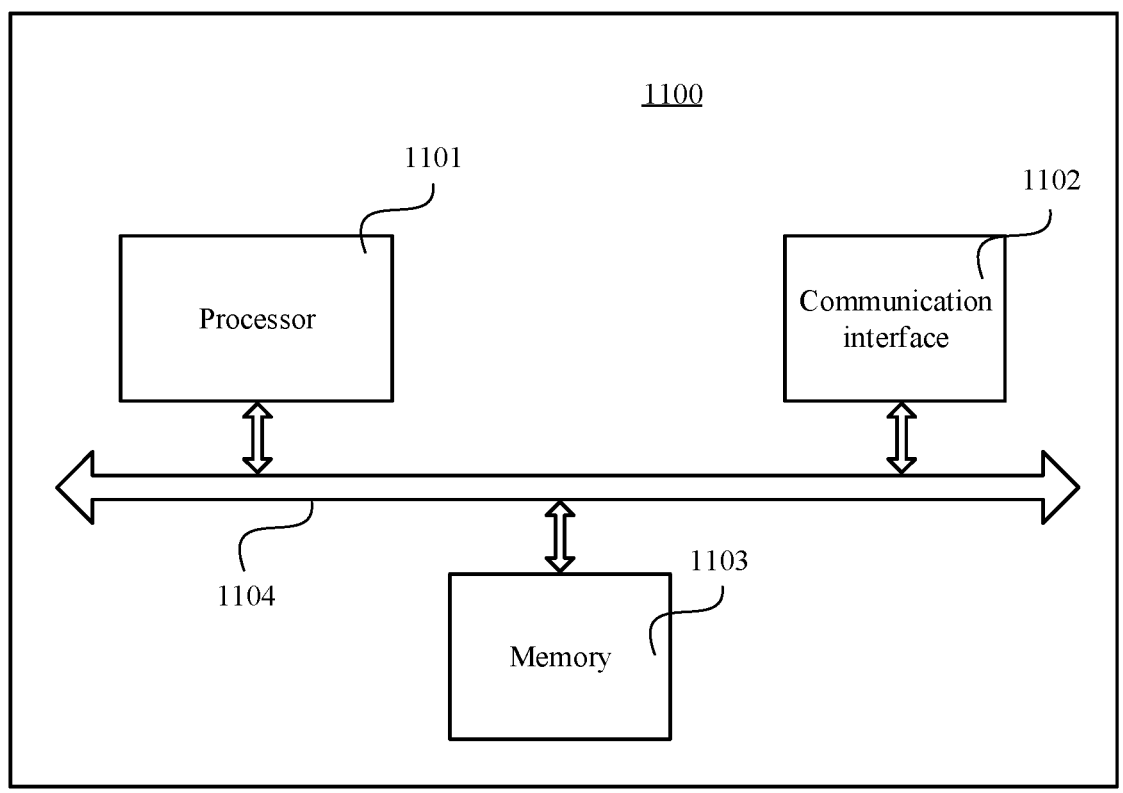
FIG. 11 is a schematic diagram of a structure of a communication apparatus according to an embodiment of this application.

The following describes in detail communication apparatuses provided in embodiments of this application with reference to FIG. 10 and FIG. 11. It should be understood that descriptions of apparatus embodiments correspond to the descriptions of the method embodiments. Therefore, for content that is not described in detail, refer to the foregoing method embodiments. For brevity, details are not described herein again.

For example, when the apparatus 1000 implements a function of the DU of the network side device in the procedure shown in FIG. 6:

the communication unit 1002 is configured to receive a first message from a CU of a network side device, where the first message includes a second message, and the second message is used to indicate a terminal side device to enter an inactive state and release a connection to the network side device; and the processing unit 1001 is configured to store a context of the terminal side device in the inactive state.

In a possible implementation, the first message includes first information, and the first information is used to indicate the apparatus to store an air interface context in the context of the terminal side device.

The processing unit 1001 is specifically configured to: store the air interface context of the terminal side device based on the first information.

In a possible implementation, the first information is further used to indicate the apparatus to store an F1 context in the context of the terminal side device.

The F1 context includes a data transmission channel of the terminal side device, and the data transmission channel is an F1 interface-dedicated transmission tunnel corresponding to data radio bearer DRB data of the terminal side device.

In a possible implementation, the first message is an interface message between the apparatus and the CU of the network side device, but is not a user equipment UE context release command message in the interface message.

In a possible implementation, the context includes one or more of the following:

a configured grant configured for the terminal side device;
configuration information of a physical downlink control channel PDCCH configured for the terminal side device;
a temporary identity for scrambling the PDCCH;
an inactive radio network temporary identity I-RNTI configured for the terminal side device; and
configuration information of an RLC layer of a radio bearer configured for the terminal side device.

For example, when the apparatus 1000 implements a function of the CU of the network side device in the procedure shown in FIG. 6:

the processing unit 1001 is configured to generate a first message when determining that a terminal side device enters an inactive state, where the first message includes a second message, and the second message is used to indicate the terminal side device to enter the inactive state and release a connection to a network side device; and the communication unit 1002 is configured to send the first message to a distributed unit DU of the network side device, where the first message is used to indicate the DU of the network side device to store a context of the terminal side device in the inactive state.

In a possible implementation, the first message includes first information, and the first information is used to indicate the DU of the network side device to store an air interface context in the context of the terminal side device.

In a possible implementation, the first information is further used to indicate the DU of the network side device to store an F1 context in the context of the terminal side device.

The F1 context includes a data transmission channel of the terminal side device, and the data transmission channel is an F1 interface-dedicated transmission tunnel corresponding to data radio bearer DRB data of the terminal side device.

In a possible implementation, the first message is an interface message between the apparatus and the DU of the network side device, but is not a context release command message in the interface message.

In a possible implementation, the context includes one or more of the following:

a configured grant configured for the terminal side device;
configuration information of a physical downlink control channel PDCCH configured for the terminal side device;
a temporary identity for scrambling the PDCCH;
an inactive radio network temporary identity I-RNTI configured for the terminal side device; and
configuration information of an RLC layer of a radio bearer configured for the terminal side device.

Figure 8:
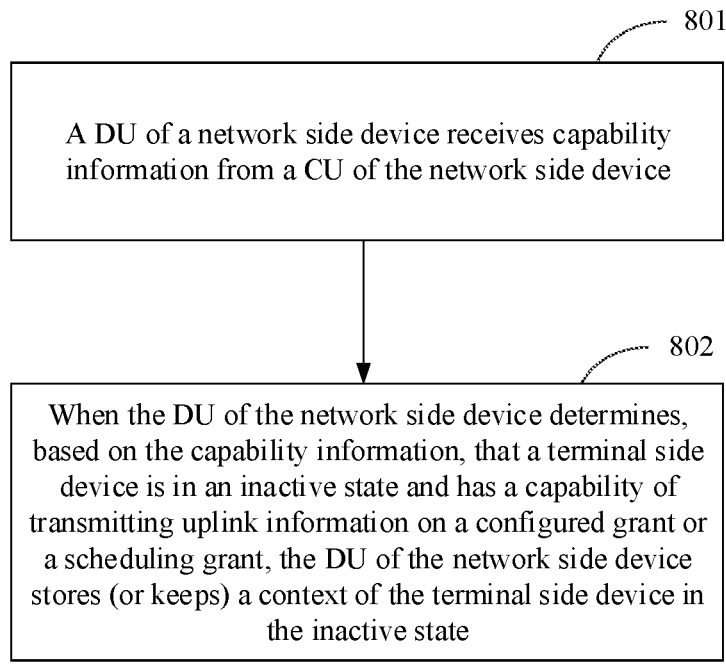
FIG. 8 is a schematic flowchart of a context management method according to an embodiment of this application.

For example, when the apparatus 1000 implements a function of the DU of the network side device in the procedure shown in FIG. 8:

the communication unit 1002 is configured to receive capability information from a CU of a network side device, where the capability information is used to indicate a capability of a terminal side device; and the processing unit 1001 is configured to: when determining, based on the capability information, that the terminal side device is in an inactive state and has a capability of transmitting uplink information on a configured grant, store a context of the terminal side device in the inactive state.

In a possible implementation, the processing unit is specifically configured to store an air interface context in the context of the terminal side device.

In a possible implementation, the processing unit is specifically configured to store an F1 context in the context of the terminal side device.

The F1 context includes a data transmission channel of the terminal side device, and the data transmission channel is an F1 interface-dedicated transmission tunnel corresponding to data radio bearer DRB data of the terminal side device.

In a possible implementation, the context includes one or more of the following:
a configured grant configured for the terminal side device;
configuration information of a PDCCH configured for the terminal side device;
a temporary identity for scrambling the PDCCH;
an inactive radio network temporary identity I-RNTI configured for the terminal side device; and
configuration information of an RLC layer of a radio bearer configured for the terminal side device.

FIG. 11 shows an apparatus 1100 according to an embodiment of this application. The apparatus shown in FIG. 11 may be an implementation of a hardware circuit of the apparatus shown in FIG. 10. For ease of description, FIG. 11 only shows main components of the communication apparatus.

The apparatus 1100 shown in FIG. 11 includes at least one processor 1101, and the apparatus 1100 may further include at least one memory 1103, configured to store program instructions and/or data. The memory 1103 is coupled to the processor 1101. Coupling in this embodiment of this application is indirect coupling or a communication connection between apparatuses, units, or modules, may be in an electrical, a mechanical, or another form, and is used for information exchange between the apparatuses, the units, or the modules. The processor 1101 may operate in collaboration with the memory 1103. The processor 1101 may execute the program instructions stored in the memory 1103. At least one of the at least one memory may be included in the processor.

In an implementation process, the steps in the foregoing methods may be implemented by using an integrated logic circuit of hardware in the processor or by using instructions in a form of software. The steps of the methods disclosed with reference to embodiments of this application may be performed by a hardware processor, or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor.

It should be noted that the processor in embodiments of this application may be an integrated circuit chip, and has a signal processing capability. In an implementation process, the steps in the foregoing method embodiments may be implemented by using an integrated logic circuit of hardware in the processor or by using instructions in a form of software. The foregoing processor may be a general-purpose processor, a digital signal processing circuit (DSP), an application-specific integrated circuit (ASIC), a field programmable gate array (FPGA), another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be performed by a hardware decoding processor, or may be performed by using a combination of hardware in the decoding processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor.

It may be understood that, in embodiments of this application, the memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification includes but is not limited to these and any memory of another appropriate type.

The apparatus 1100 may further include a communication interface 1102, configured to communicate with another device through a transmission medium, so that an apparatus in the apparatus 1100 communicates with another device. In this embodiment of this application, the communication interface may be a transceiver, a circuit, a bus, a module, or a communication interface of another type. In this embodiment of this application, when the communication interface is a transceiver, the transceiver may include an independent receiver and an independent transmitter, or may be a transceiver integrated with a transceiver function or an interface circuit.

The apparatus 1100 may further include a communication line 1104. The communication interface 1102, the processor 1101, and the memory 1103 may be connected to each other through the communication line 1104. The communication line 1104 may be a peripheral component interconnect (PCI) bus, an extended industry standard architecture (EISA) bus, or the like. The communication line 1104 may be classified into an address bus, a data bus, a control bus, and the like. For ease of representation, only one thick line is used to represent the bus in FIG. 11, but this does not mean that there is only one bus or only one type of bus.

For example, when the apparatus 1100 implements a function of the DU of the network side device in the procedure shown in FIG. 6:
the communication interface 1102 is configured to receive a first message from a CU of a network side device, where the first message includes a second message, and the second message is used to indicate a terminal side device to enter an inactive state and release a connection to the network side device; and
the processor 1101 is configured to store a context of the terminal side device in the inactive state.

In a possible implementation, the first message includes first information, and the first information is used to indicate the apparatus to store an air interface context in the context of the terminal side device.

The processor 1101 is specifically configured to: store the air interface context of the terminal side device based on the first information.

In a possible implementation, the first information is further used to indicate the apparatus to store an F1 context in the context of the terminal side device.

The F1 context includes a data transmission channel of the terminal side device, and the data transmission channel is an F1 interface-dedicated transmission tunnel corresponding to data radio bearer DRB data of the terminal side device.

In a possible implementation, the first message is an interface message between the apparatus and the CU of the network side device, but is not a user equipment UE context release command message in the interface message.

In a possible implementation, the context includes one or more of the following:
  a configured grant configured for the terminal side device;
  configuration information of a physical downlink control channel PDCCH configured for the terminal side device;
  a temporary identity for scrambling the PDCCH;
  an inactive radio network temporary identity I-RNTI configured for the terminal side device; and
  configuration information of an RLC layer of a radio bearer configured for the terminal side device.

For example, when the apparatus 1100 implements a function of the CU of the network side device in the procedure shown in FIG. 6:
  the processor 1101 is configured to generate a first message when determining that a terminal side device enters an inactive state, where the first message includes a second message, and the second message is used to indicate the terminal side device to enter the inactive state and release a connection to a network side device; and
  the communication interface 1102 is configured to send the first message to a distributed unit DU of the network side device, where the first message is used to indicate the DU of the network side device to store a context of the terminal side device in the inactive state.

In a possible implementation, the first message includes first information, and the first information is used to indicate the DU of the network side device to store an air interface context in the context of the terminal side device.

In a possible implementation, the first information is further used to indicate the DU of the network side device to store an F1 context in the context of the terminal side device.

The F1 context includes a data transmission channel of the terminal side device, and the data transmission channel is an F1 interface-dedicated transmission tunnel corresponding to data radio bearer DRB data of the terminal side device.

In a possible implementation, the first message is an interface message between the apparatus and the DU of the network side device, but is not a context release command message in the interface message.

In a possible implementation, the context includes one or more of the following:
  a configured grant configured for the terminal side device;
  configuration information of a physical downlink control channel PDCCH configured for the terminal side device;
  a temporary identity for scrambling the PDCCH;
  an inactive radio network temporary identity I-RNTI configured for the terminal side device; and
  configuration information of an RLC layer of a radio bearer configured for the terminal side device.

For example, when the apparatus 1100 implements a function of the DU of the network side device in the procedure shown in FIG. 8:
  the communication interface 1102 is configured to receive capability information from a CU of a network side device, where the capability information is used to indicate a capability of a terminal side device; and
  the processor 1101 is configured to: when determining, based on the capability information, that the terminal side device is in an inactive state and has a capability of transmitting uplink information on a configured grant, store a context of the terminal side device in the inactive state.

In a possible implementation, the processor 1101 is specifically configured to store an air interface context in the context of the terminal side device.

In a possible implementation, the processor 1101 is specifically configured to store an F1 context in the context of the terminal side device.

The F1 context includes a data transmission channel of the terminal side device, and the data transmission channel is an F1 interface-dedicated transmission tunnel corresponding to data radio bearer DRB data of the terminal side device.

In a possible implementation, the context includes one or more of the following:
  a configured grant configured for the terminal side device;
  configuration information of a PDCCH configured for the terminal side device;
  a temporary identity for scrambling the PDCCH;
  an inactive radio network temporary identity I-RNTI configured for the terminal side device; and
  configuration information of an RLC layer of a radio bearer configured for the terminal side device.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include compute-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can indicate the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the claims of this application and equivalent technologies thereof.

What is claimed is:

1. A context management method, comprising:
   receiving, by a distributed unit (DU) of a network side device, a first message from a centralized unit (CU) of the network side device, wherein the first message comprises a second message, and the second message indicates that a terminal side device is to enter an inactive state and release a connection to the network side device;
   storing, by the DU of the network side device, a context of the terminal side device in the inactive state, wherein the stored context is for the DU to receive uplink data from the terminal side device while the terminal side device is in the inactive state; and
   receiving, by the DU, based on the stored context of the terminal side device, uplink data from the terminal side device while the terminal side device is in the inactive state;
   wherein the first message comprises first information, and the first information indicates that the DU of the network side device is to store an air interface context in the context of the terminal side device; and
   wherein storing the context of the terminal side device includes storing the air interface context of the terminal side device based on the first information.

2. The method according to claim 1, wherein the first information further indicates that the DU of the network side device is to store an F1 context in the context of the terminal side device;
   wherein the F1 context comprises a data transmission channel of the terminal side device, and the data transmission channel is an F1 interface-dedicated transmission tunnel corresponding to data radio bearer (DRB) data of the terminal side device.

3. The method according to claim 1, wherein the first message is an interface message between the CU of the network side device and the DU of the network side device, but does not include a user equipment (UE) context release command message.

4. The method according to claim 1, wherein the context comprises one or more of the following:
   a configured grant configured for the terminal side device;
   configuration information of a physical downlink control channel (PDCCH) configured for the terminal side device;
   a temporary identity for scrambling the PDCCH; or
   configuration information of a radio link control (RLC) layer of a radio bearer configured for the terminal side device.

5. A context management method, comprising:
   generating, by a centralized unit (CU) of a network side device, a first message based on determining that a terminal side device is to enter an inactive state, wherein the first message comprises a second message, and the second message indicates that the terminal side device is to enter the inactive state and release a connection to the network side device; and
   sending, by the CU of the network side device, the first message to a distributed unit (DU) of the network side device, wherein the first message indicates that the DU of the network side device is to store a context of the terminal side device in the inactive state, wherein the stored context is for the DU to receive uplink data from the terminal side device while the terminal side device is in the inactive state;
   wherein the first message comprises first information, and the first information indicates that the DU of the network side device is to store an air interface context in the context of the terminal side device.

6. The method according to claim 5, wherein the first information further indicates that the DU of the network side device is to store an F1 context in the context of the terminal side device;
   wherein the F1 context comprises a data transmission channel of the terminal side device, and the data transmission channel is an F1 interface-dedicated transmission tunnel corresponding to data radio bearer (DRB) data of the terminal side device.

7. The method according to claim 5, wherein the first message is an interface message between the CU of the network side device and the DU of the network side device, but does not include a user equipment (UE) context release command message.

8. The method according to claim 5, wherein the context comprises one or more of the following:
   a configured grant configured for the terminal side device;
   configuration information of a physical downlink control channel (PDCCH) configured for the terminal side device;
   a temporary identity for scrambling the PDCCH; or
   configuration information of a radio link control (RLC) layer of a radio bearer configured for the terminal side device.

9. An apparatus comprising:
   at least one processor; and
   at least one memory storing instructions;
   wherein the at least one processor is configured to execute the instructions to facilitate performance of the following operations by a distributed unit (DU) of a network side device;
   receiving a first message from a centralized unit (CU) of the network side device, wherein the first message comprises a second message, and the second message indicates that a terminal side device is to enter an inactive state and release a connection to the network side device;
   storing a context of the terminal side device in the inactive state, wherein the stored context is for the DU to receive uplink data from the terminal side device while the terminal side device is in the inactive state; and
   receiving, by the DU, based on the stored context of the terminal side device, uplink data from the terminal side device while the terminal side device is in the inactive state;
   wherein the first message comprises first information, and the first information indicates that the DU of the network side device is to store an air interface context in the context of the terminal side device; and wherein storing the context of the terminal side device includes storing the air interface context of the terminal side device based on the first information.

10. The apparatus according to claim 9, wherein the first information further indicates that the DU of the network side device is to store an F1 context in the context of the terminal side device;

wherein the F1 context comprises a data transmission channel of the terminal side device, and the data transmission channel is an F1 interface-dedicated transmission tunnel corresponding to data radio bearer (DRB) data of the terminal side device.

11. The apparatus according to claim 9, wherein the first message is an interface message between the CU of the network side device and the DU of the network side device, but does not include a user equipment (UE) context release command message in the interface message.

12. The apparatus according to claim 9, wherein the context comprises one or more of the following:

a configured grant configured for the terminal side device;

configuration information of a physical downlink control channel (PDCCH) configured for the terminal side device;

a temporary identity for scrambling the PDCCH; or configuration information of a radio link control (RLC) layer of a radio bearer configured for the terminal side device.

13. An apparatus, comprising:

at least one processor; and at least one memory storing instructions;

wherein the at least one processor is configured to execute the instructions to facilitate performance of the following operations by a centralized unit (CU) of a network side device:

generating a first message based on determining that a terminal side device is to enter an inactive state, wherein the first message comprises a second message, and the second message indicates that the terminal side device is to enter the inactive state and release a connection to the network side device; and sending the first message to a distributed unit (DU) of the network side device, wherein the first message indicates that the DU of the network side device is to store a context of the terminal side device in the inactive state, wherein the stored context is for the DU to receive uplink data from the terminal side device while the terminal side device is in the inactive state;

wherein the first message comprises first information, and the first information indicates that the DU of the network side device is to store an air interface context in the context of the terminal side device.

14. The apparatus according to claim 13, wherein the first information further indicates that the DU of the network side device is to store an F1 context in the context of the terminal side device;

wherein the F1 context comprises a data transmission channel of the terminal side device, and the data transmission channel is an F1 interface-dedicated transmission tunnel corresponding to data radio bearer (DRB) data of the terminal side device.

15. The apparatus according to claim 13, wherein the first message is an interface message between the CU of the network side device and the DU of the network side device, but does not include a user equipment (UE) context release command message.

16. The apparatus according to claim 13, wherein the context comprises one or more of the following:

a configured grant configured for the terminal side device;

configuration information of a physical downlink control channel (PDCCH) configured for the terminal side device;

a temporary identity for scrambling the PDCCH; or configuration information of a radio link control (RLC) layer of a radio bearer configured for the terminal side device.

17. The apparatus according to claim 13, wherein the apparatus is a chip of the CU.

18. The apparatus according to claim 9, wherein the apparatus is a chip of the DU.

* * * * *

UNITED STATES PATENT AND TRADEMARK OFFICE
CERTIFICATE OF CORRECTION

| | | |
|---|---|---|
| PATENT NO. | : 12,336,039 B2 | Page 1 of 1 |
| APPLICATION NO. | : 17/855166 | |
| DATED | : June 17, 2025 | |
| INVENTOR(S) | : Xu et al. | |

It is certified that error appears in the above-identified patent and that said Letters Patent is hereby corrected as shown below:

In the Claims

Claim 9: Column 28, Line 51: "side device;" should read as -- side device: --.

Signed and Sealed this
Fourth Day of November, 2025

John A. Squires
*Director of the United States Patent and Trademark Office*